US010808165B2

(12) United States Patent
Crew et al.

(10) Patent No.: US 10,808,165 B2
(45) Date of Patent: Oct. 20, 2020

(54) CORROSION INHIBITOR COMPOSITIONS AND METHODS OF USING SAME

(71) Applicant: ChampionX USA Inc., Sugar Land, TX (US)

(72) Inventors: Benjamin Crew, Eagan, MN (US); Kim R. Solomon, River Falls, WI (US)

(73) Assignee: ChampionX USA Inc., Sugar Land, TX (US)

( * ) Notice: Subject to any disclaimer, the term of this patent is extended or adjusted under 35 U.S.C. 154(b) by 209 days.

(21) Appl. No.: 15/591,466

(22) Filed: May 10, 2017

(65) Prior Publication Data
US 2017/0327728 A1 Nov. 16, 2017

Related U.S. Application Data

(60) Provisional application No. 62/335,794, filed on May 13, 2016.

(51) Int. Cl.
E21B 41/02 (2006.01)
C09K 8/54 (2006.01)
C11D 3/00 (2006.01)
C11D 11/00 (2006.01)
C23F 11/16 (2006.01)
C11D 1/22 (2006.01)
C09K 8/524 (2006.01)
C11D 1/24 (2006.01)
E21B 37/06 (2006.01)
C23F 11/04 (2006.01)
E21B 43/34 (2006.01)

(52) U.S. Cl.
CPC .............. C09K 8/54 (2013.01); C09K 8/524 (2013.01); C11D 1/22 (2013.01); C11D 1/24 (2013.01); C11D 3/0073 (2013.01); C11D 11/0041 (2013.01); C23F 11/04 (2013.01); C23F 11/163 (2013.01); E21B 37/06 (2013.01); E21B 41/02 (2013.01); E21B 43/34 (2013.01); C09K 2208/32 (2013.01)

(58) Field of Classification Search
None
See application file for complete search history.

(56) References Cited

U.S. PATENT DOCUMENTS

| | | | |
|---|---|---|---|
| 2,081,876 A | 5/1937 | Prahl et al. | |
| 2,227,804 A | 1/1941 | Britton et al. | |
| 2,371,207 A | 3/1945 | Zublin et al. | |
| 2,990,375 A | 6/1961 | Steinhauer et al. | |
| 3,110,683 A | 11/1963 | Steinhauer et al. | |
| 3,171,797 A | 3/1965 | Klingenmaier et al. | |
| 3,457,107 A | 7/1969 | Mickelson et al. | |
| 3,945,437 A | 3/1976 | Chiu et al. | |
| 4,029,570 A | 6/1977 | Coffman et al. | |
| 4,089,803 A | 5/1978 | Bessler | |
| 4,276,933 A | 7/1981 | Kudchadker et al. | |
| 4,532,051 A | 7/1985 | Nuckels nee Byth et al. | |
| 4,739,831 A * | 4/1988 | Settlemeyer | C09K 8/594 166/270.2 |
| 5,035,876 A | 7/1991 | Castellano | |
| 5,060,727 A | 10/1991 | Schramm et al. | |
| 5,110,487 A | 5/1992 | Current | |
| 5,171,459 A | 12/1992 | Kaplan | |
| 5,203,411 A | 4/1993 | Dawe et al. | |

(Continued)

FOREIGN PATENT DOCUMENTS

CN 101885963 A 11/2010
CN 104650841 A 5/2015

(Continued)

OTHER PUBLICATIONS

Horsup et al. "Breakthrough Corrosion Inhibitor Technology for Heavily Fouled Systems", Corrosion, vol. 65, No. 8, pp. 527-544, Aug. 2009.
International Search Report for International Application No. PCT/US2017/031898, dated Aug. 3, 2017, 6 pages.
Written Opinion for International Application No. PCT/US2017/031898, dated Aug. 3, 2017, 7 pages.
Garlits, Don, "Kerosene works as rust inhibitor," Ocala Star-Banner, Friday, Jan. 17, 1992, 1 page.
Calfax DBA-70, Diphenyl Oxide Disulfonate Anionic Surfactants, Retrieved from https://www.pilotchemical.com/products/calfax#calfax_dba70 on Sep. 5, 2019.
Calfax DBA-70, Pilot Chemical—datasheet, Retrieved fromhttps://polymer-additives.specialchem.com/product/a-pilot-chemicals-calfax-dba-70 on Sep. 5, 2019.

(Continued)

Primary Examiner — Andrew Sue-Ako
(74) Attorney, Agent, or Firm — Kagan Binder, PLLC

(57) ABSTRACT

Disclosed are inhibitor/cleaner compositions comprising alkyldiphenyloxide disulfonates, and methods of inhibiting corrosion of and removing schmoo from metal containments in contact with corrosive water sources. Also disclosed are metal containment assemblages comprising inhibitor/cleaner compositions and metal containment therefore. The alkyldiphenyloxide disulfonates are soluble or substantially soluble in the water sources and inhibit corrosion of the metal containments by the water sources containing corrodents. The alkyldiphenyloxide disulfonates also remove schmoo from the metal containments. The inhibitor/cleaners of the invention are useful for addition to produced waters and other corrosive water sources resulting from enhanced oil recovery operations. The inhibitor/cleaners inhibit corrosion of tanks, devices, and other metal containments such as carbon steel pipes which come into contact with produced waters from the oil recovery operations, while also providing schmoo reduction and removal from the metal containments. The inhibitor cleaners are also useful for addition to other corrosive aqueous fluids to inhibit corrosion of metal containments with which the aqueous fluids come into contact, such as corrosive aqueous discharge from mines and other industrial operations such as paper-making.

15 Claims, No Drawings

(56) References Cited

U.S. PATENT DOCUMENTS

| | | | |
|---|---|---|---|
| 5,411,086 | A | 5/1995 | Burcham et al. |
| 5,501,815 | A | 3/1996 | Man |
| 5,710,121 | A | 1/1998 | Tracy et al. |
| 5,759,409 | A | 6/1998 | Knauf et al. |
| 5,851,429 | A | 12/1998 | Magyar |
| 5,854,187 | A | 12/1998 | Blum et al. |
| 5,922,671 | A | 7/1999 | Tracy et al. |
| 6,022,403 | A | 2/2000 | Kuo |
| 6,147,047 | A | 11/2000 | Robbins et al. |
| 6,294,093 | B1 | 9/2001 | Selvarajan et al. |
| 6,506,263 | B1 | 1/2003 | Basaly et al. |
| 6,710,022 | B1 | 3/2004 | Kwetkat et al. |
| 6,743,764 | B1 | 6/2004 | Wallick et al. |
| 6,852,152 | B2 | 2/2005 | Galasco et al. |
| 7,380,606 | B2 | 6/2008 | Purlsey et al. |
| 7,566,744 | B2 | 7/2009 | Newman et al. |
| 7,615,516 | B2 | 11/2009 | Yang et al. |
| 7,655,603 | B2 | 2/2010 | Crews |
| 7,886,824 | B2 | 2/2011 | Kakadjian et al. |
| 7,893,010 | B2 | 2/2011 | Ali et al. |
| 7,960,314 | B2 | 6/2011 | Van Zanten et al. |
| 7,989,404 | B2 | 8/2011 | Kakadjian et al. |
| 7,998,911 | B1 | 8/2011 | Berger et al. |
| 8,091,646 | B2 | 1/2012 | Quintero et al. |
| 8,746,341 | B2 | 6/2014 | Nguyen et al. |
| 8,921,298 | B2 | 12/2014 | Tyborski et al. |
| 8,950,494 | B2 | 2/2015 | Nguyen et al. |
| 8,961,807 | B2 | 2/2015 | Fu et al. |
| 2003/0032683 | A1 | 2/2003 | Spalding |
| 2003/0166472 | A1 | 9/2003 | Pursley et al. |
| 2004/0266649 | A1 | 12/2004 | Thekkekandam et al. |
| 2006/0019836 | A1 | 1/2006 | Li et al. |
| 2006/0258541 | A1 | 11/2006 | Crews |
| 2006/0260815 | A1* | 11/2006 | Dahanayake .......... C09K 8/602 166/308.6 |
| 2007/0272277 | A1 | 11/2007 | Jeffreys |
| 2007/0293404 | A1 | 12/2007 | Hutchins et al. |
| 2008/0287324 | A1 | 11/2008 | Pursley et al. |
| 2009/0006215 | A1 | 1/2009 | Coker et al. |
| 2009/0020002 | A1 | 1/2009 | Williams et al. |
| 2009/0062153 | A1 | 3/2009 | Gray |
| 2009/0149557 | A1 | 6/2009 | Talingting-Pabalan et al. |
| 2009/0200027 | A1 | 8/2009 | Kakadjian et al. |
| 2009/0281004 | A1 | 11/2009 | Ali et al. |
| 2009/0325826 | A1 | 12/2009 | Quintero et al. |
| 2010/0314118 | A1 | 12/2010 | Quintero et al. |
| 2011/0021386 | A1 | 1/2011 | Ali et al. |
| 2011/0021388 | A1 | 1/2011 | Van Zanten et al. |
| 2011/0218126 | A1 | 9/2011 | Berger et al. |
| 2011/0220353 | A1 | 9/2011 | Bittner et al. |
| 2011/0247965 | A1 | 10/2011 | Nguyen et al. |
| 2011/0281779 | A1 | 11/2011 | Weerasooriya et al. |
| 2012/0021471 | A1 | 1/2012 | Martin et al. |
| 2012/0088697 | A1 | 4/2012 | Gatlin et al. |
| 2012/0125620 | A1 | 5/2012 | Nguyen et al. |
| 2012/0184470 | A1 | 7/2012 | Mao et al. |
| 2012/0214714 | A1 | 8/2012 | Whitwell et al. |
| 2013/0026103 | A1 | 1/2013 | Peterson et al. |
| 2013/0180723 | A1 | 7/2013 | Crick et al. |
| 2013/0261033 | A1 | 10/2013 | Nguyen |
| 2013/0261227 | A1 | 10/2013 | Nguyen |
| 2013/0292121 | A1 | 11/2013 | Penny et al. |
| 2013/0332130 | A1 | 12/2013 | Loveless et al. |
| 2014/0166537 | A1 | 6/2014 | Kremer et al. |
| 2015/0011453 | A1 | 1/2015 | Bennett et al. |
| 2015/0038470 | A1 | 2/2015 | Keasler et al. |
| 2015/0057196 | A1 | 2/2015 | Debord et al. |
| 2015/0141303 | A1* | 5/2015 | Harwell ................. C09K 8/584 507/255 |
| 2016/0251568 | A1 | 9/2016 | Do et al. |

FOREIGN PATENT DOCUMENTS

| | | | |
|---|---|---|---|
| EP | 1639989 | A1 | 3/2006 |
| GB | 1396088 | A | 5/1975 |
| KR | 20100107486 | A | 10/2010 |
| WO | 1999052161 | A1 | 10/1999 |
| WO | 99/58631 | A1 | 11/1999 |
| WO | 2001000760 | A1 | 1/2001 |
| WO | 2009/006251 | A1 | 1/2009 |
| WO | 2009/127922 | A2 | 10/2009 |
| WO | 2011/106287 | A1 | 9/2011 |
| WO | 2013/148760 | A1 | 10/2013 |
| WO | 2013/158989 | A1 | 10/2013 |
| WO | 2014/113445 | A1 | 7/2014 |

OTHER PUBLICATIONS

DOW Chemical Taiwan Limited, Dowfax™ C1OL Solution Surfactant, Safety Data Sheet, Issue Date Aug. 26, 2019, 12 pages.

Dow Chemical Company, Dowfax Anionic Surfactants for High-Performance Products, Published Jul. 2000, 20 pages.

Galindo, T., et al. "Evaluation of Environmentally Acceptable Surfactants for Applicants as Flowback Aids", SPE International Symposium on Oilfield Chemistry, Apr. 1, 2013, pp. 1-12.

Razi, M., et al. "Effect of a Different Formulation of Demulsifiers on the Efficiency of Chemical Demulsification of Heavy Crude Oil", Journal of Chemical & Engineering Data, 56(9), Jun. 9, 2011, pp. 2936-2945.

Schramm, L.L., et al. " Surfactants and their applications", Annual Reports Section "C" Physical Chemistry, 99(1), Jan. 1, 2003, 46 pages.

"Clay Stabilization", Chapter 3: Petroleum Engineer's Guide to Oil Field Chemicals and Fluids, 2012 pp. 125-148, booksite.elsevier.com/samplechapters/9780123838445/9780123838445.pdf.

Nalmet 1689 Technology for Soluble Metal Control, Product Data Sheet, Bulletin B-1210, 3 pages, 2012.

INEOS Oxide, Technical Data Sheet, Lauryl Alcohol Ethoxylates, 2004, 4 pages.

\* cited by examiner

CORROSION INHIBITOR COMPOSITIONS AND METHODS OF USING SAME

FIELD OF THE INVENTION

The present invention generally relates to methods and compositions for corrosion inhibition for use in the oil and gas exploration, recovery, and processing industries. More specifically, the invention relates to methods of producing corrosion inhibitor compositions by applying a corrosion inhibitor to a water source and methods of inhibiting corrosion by contacting a corrosion inhibitor composition comprising monoalkyl diphenylether disulfonates to metal containment.

BACKGROUND

Aqueous liquids are injected into the earth and/or recovered from the earth during subterranean hydrocarbon recovery processes such as hydraulic fracturing (fracking) and tertiary oil recovery. In one or more such processes, an aqueous liquid called an "injectate" is injected into a subterranean formation. Injectates include water and entrained solids and/or solvents therein. In one or more such processes a water source called "produced water" is recovered, i.e. flows back from the subterranean formation and is collected. Produced water includes one or more of injectate, connate (native water present in the subterranean formation along with the hydrocarbon), sea water, and minor (<5 wt. %) amounts of hydrocarbon products, which are hydrocarbon liquids or solids entrained (dispersed, emulsified, or dissolved) in the produced water. In embodiments, one or more of the injectate and the produced water includes "corrodents" such as salts and/or other dissolved solids, liquids, or gasses that cause, accelerate, or promote corrosion of metal containments such as metal pipelines used to transport the water sources toward, into, out of, or away from a subterranean formation, metal tanks used to hold the water sources for a period of time, and/or other metal equipment that contacts the water sources before, during, or after injection or production. Non-limiting examples of such corrodents are hydrogen sulfide, carbon dioxide, oxygen, sodium chloride, calcium chloride, and/or sulfur dioxide. As a result, almost all operators in the oil and gas industry employ corrosion inhibitors to reduce internal corrosion in metal containments which are contacted by aqueous liquids containing corrodents.

In some cases, a blend of two or more corrosion inhibitors is deployed, for example as components of a mixture designed for a particular hydrocarbon recovery process. In some cases the one or more corrosion inhibitors are added to an injectate and/or produced water along with additives such as polymers, surfactants, scale inhibitors, paraffin inhibitors, metal complexing agents, and the like. Such corrosion inhibitors are beneficial in that they permit the use of carbon steel components rather than the much more expensive high nickel, cobalt, and chromium alloys or other materials either more expensive than carbon steel and/or which inherently entail other disadvantages in suitability for the purpose of liquid containment. Corrosion inhibitors are added to the liquids and dissolved gasses which come into contact with metal surfaces and such inhibitors prevent, retard, delay, reverse, and/or otherwise inhibit the corrosion of metal surfaces such as carbon-steel metal surfaces. While highly desirable for this purpose, their use entails additional cost for the operator. Further, such corrosion inhibitors must ultimately be disposed in the environment. It is therefore advantageous to provide corrosion inhibitors which are effective in the lowest amounts and to provide compositions containing corrosion inhibitors effective at the lowest concentrations, wherein the corrosion inhibitors provide effective corrosion inhibition using the least amounts of corrosion inhibitor.

In embodiments, produced water is reused in an injectate wherein the injectate comprises, consists of, or consists essentially of the produced water, the injectate is reinjected into a pipe in fluid communication with a subterranean reservoir, and a crude oil/recycled produced water is subsequently recovered from a subterranean reservoir. If such injectate contains corrosion inhibitor, some of the corrosion inhibitor remains in the ground, some is returned as part of the recycled produced water, or both. If some of the corrosion inhibitor remains in the ground, this is a loss to the operator. Further, the corrosion inhibitor remaining in the ground, depending on its chemical nature and concentration, can be environmentally deleterious. It is therefore also advantageous in this use to provide corrosion inhibitors which are effective in the lowest amounts and to provide compositions containing corrosion inhibitors effective at the lowest concentrations, wherein the corrosion inhibitors provide effective corrosion inhibition using the least amounts of corrosion inhibitor.

Schmoo is a solid, paste-like, or sludge-like substance that adheres to almost any surface with which it comes into contact and is particularly difficult to remove. Deposits contributing to schmoo may include, for example, sand, clays, sulfur, naphthenic acid salts, corrosion byproducts, biomass, and other hydrocarbonaceous materials bound together with oil. Schmoo can comprise proppant, formation sand, formation fines, iron sulfides, oil, corrosion inhibitor, and/or biofilm. Schmoo is frequently, greasy, malodorous; and adhering to the interior walls of pipes, schmoo can reduce the effective internal diameter of the pipes and reduce flow of liquids through the pipes or even cause blockages in the pipes. Further, some types of schmoo promote corrosion of metal pipes. Schmoo frequently deposits in pipes and other metal containments comprising metals susceptible to corrosion, and is prevalent in such metal containments that carry produced water and other aqueous solutions having one or more corrodents entrained therein. It is therefore be an advantage to provide a corrosion inhibitor which also has schmoo-inhibiting or schmoo removing capability or capabilities. It is a particular advantage to provide such a corrosion inhibitor which is effective at inhibiting corrosion and removing schmoo at lower concentrations or in lower total amounts, so that loss to the operator and environmentally deleterious effects are minimized. It is particularly advantageous to provide a schmoo-removing corrosion inhibiting composition.

SUMMARY OF THE INVENTION

Disclosed are methods of removing schmoo and/or inhibiting corrosion, the methods comprising: applying about 5 ppm to about 4000 ppm of an inhibitor/cleaner to a water source to produce an inhibitor/cleaner composition, wherein the inhibitor/cleaner is substantially soluble in the water source and the inhibitor cleaner comprises one or more alkyldiphenyloxide disulfonates, each alkyldiphenyloxide disulfonate of the one or more alkyldiphenyloxide disulfonates having the formula (I), (II), (III), or (IV)

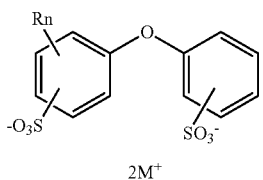

(I)

2M⁺

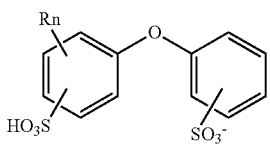

(II)

M⁺

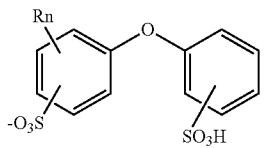

(III)

M⁺

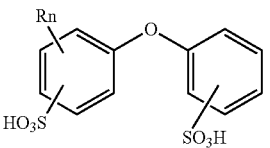

(IV)

wherein R is a $C_6$ to $C_{22}$ alkyl group, n is 1 or 2, and M⁺ is selected from the group consisting of Na⁺, K⁺, NH₄⁺, primary ammonium, secondary ammonium, tertiary ammonium, and quaternary ammonium; and contacting a surface of a metal containment with the inhibitor/cleaner composition, wherein about 1% to about 100% of the area of the surface comprises a schmoo attached to the surface. In embodiments, the methods further comprise recovering a crude oil/produced water from a subterranean reservoir and separating the crude oil/produced water to provide the produced water and a crude oil.

Also disclosed are inhibitor/cleaner compositions comprising an one or more alkyldiphenyloxide disulfonates of the formula (I), (II), (III), (IV), or combinations thereof.

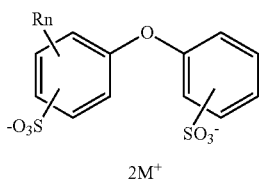

(I)

2M⁺

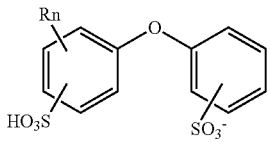

(II)

M⁺

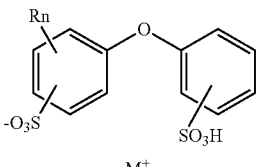

(III)

M⁺

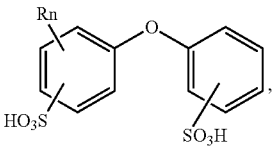

(IV)

wherein R is a $C_6$ to $C_{22}$ alkyl group, n is 1 or 2, and wherein M⁺ is selected from the group consisting of Na⁺, K⁺, NH₄⁺, primary ammonium, secondary ammonium, tertiary ammonium, and quaternary ammonium; and a water source, wherein the one or more alkyldiphenyloxide disulfonates is soluble in the water source.

Also disclosed are metal containment assemblages comprising a metal containment and an inhibitor/cleaner composition comprising one or more alkyldiphenyloxide disulfonates, wherein the inhibitor/cleaner composition is in contact with a surface of the metal containment and wherein about 1% to about 100% of the area of the surface of the metal containment comprises a schmoo attached to the surface.

Also disclosed are uses of the inhibitor/cleaner compositions of the invention to remove a schmoo, to inhibit corrosion, or a combination thereof.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Except where otherwise defined herein, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, "schmoo" means the heptane-insoluble but toluene-soluble fraction of crude oil.

As used herein, "ppm" means parts per million by weight. Except where otherwise noted, all concentrations recited herein are based on weight.

As used herein, "applying to" or "contact with" means combining, laying on, adhering, or any other action by which at least a first material is brought into contact with at least a second material.

As used herein, the term "injectate" means water plus any solids, liquids, and/or gasses entrained therein that is injected into a subterranean formation for the purpose of inducing hydrocarbon recovery therefrom.

As used herein, the term "water source" means a liquid comprising water and one or more corrodents. In embodiments, the water source is industrial wastewater. In some such embodiments, the industrial wastewater is produced water.

As used herein, the term "produced water" means water that flows back from a subterranean formation in a hydrocarbon recovery process and comprises hydrocarbon. In embodiments, the produced water comprises connate. In embodiments, produced water includes water that flows back from a subterranean formation in a hydrocarbon recovery process, and is subsequently separated from the bulk hydrocarbon phase but comprises an amount of residual hydrocarbon. In embodiments, the produced water is reused as a component of or as injectate, in which case it is termed "recycled produced water" herein.

As used herein, the term "residual hydrocarbon" means hydrocarbon liquids or solids entrained in produced water after bulk separation of the aqueous and hydrocarbon phases recovered in one or more subterranean hydrocarbon recovery processes. Such processes include but are not limited to hydraulic fracturing and tertiary oil recovery. As used in this context, the term "bulk separation" means sufficient separation to result in a produced water having less than 5% by weight of hydrocarbon entrained therein. As used in this context, the term "entrained" means dispersed, emulsified, or dissolved.

As used herein, "oil-recovery" means a process in which subterranean crude oil and/or gas is brought to a location from which the oil and/or gas is transported for processing and/or other forms of use. Examples of oil-recovery include extraction of crude oil from a well or oilfield, enhanced oil recovery, tertiary oil recovery, and hydraulic fracturing.

As used herein, an "oil-recovery site" is a site at which and/or proximal to which oil-recovery is effected. Examples of oil-recovery sites include oil wells, oil rigs, and oilfields.

As used herein, "connate" is native water present in a subterranean formation along with hydrocarbon.

As used herein, "corrodents" are materials which cause, initiate, catalyze, accelerate, induce, decrease the onset time of, and/or otherwise promote the corrosion of metals.

As used herein, the term "corrosion inhibitor" is a material which inhibits corrosion of metal when the corrosion inhibitor and/or a composition comprising the corrosion inhibitor is added to a water source and/or is applied to a metal before, during, and/or after corrosion.

As used herein, a "corrosion inhibitor composition" is a mixture of a corrosion inhibitor and a water source.

As used herein, "inhibit" means prevent, retard, slow, hinder, reverse, remove, or delay an undesirable process, or combinations thereof.

As used herein, the term "metal containment" means any object comprising metal capable of corrosion when contacted by a water source, wherein the containment holds, contains, transports, guides the flow of, and/or otherwise contacts a composition comprising a water source.

As used herein, "wastewater" means a water source comprising water and one or more compounds or materials derived from one or more of industrial processes including oil recovery processes, papermaking processes, manufacturing processes, food preparation processes, and phase separation processes, washing processes, toilet processes, storm drains, sedimentation ponds, or industrial/farming runoff, including partially treated water from these sources.

As used herein, "industrial wastewater" means any wastewater resulting from industrial processes such as factories, farms, mines, quarries, and oil and gas recovery operations, and/or commercial enterprise and which comprises one or more corrodents. In embodiments, industrial wastewater is produced water. In embodiments, industrial wastewater comprises, consists of, or consists essentially of outflow and/or runoff from industrial infrastructure and/or processes such as landfills, farms, storage, factories, mills, plants including power stations, incinerators and other waste treatment plants, mines, quarries, industrial drilling operations, spraying and painting, and other industrial processes as will be evident to one of skill, wherein the outflow and/or runoff comprises one or more corrodents.

As used herein, "iron" means a composition comprising, consisting of, or consisting essentially of elemental iron (Fe). In embodiments, iron comprises, consists of, or consists essentially of elemental iron and rust. In embodiments, iron comprises, consists of, or consists essentially of elemental iron, iron oxides, iron hydroxides, hydrated iron oxides, iron oxide-hydroxides, and/or mixtures thereof. In embodiments, iron additionally comprises manganese, chromium, nickel, tungsten, molybdenum, boron, titanium, vanadium, cobalt, niobium, phosphorus, sulfur, silicon, oxygen, nitrogen, copper, or mixtures thereof.

As used herein, the term "steel" means an alloy comprising, consisting of, or consisting essentially of iron and carbon.

As used herein, the term "carbon steel" means steel in which the main alloying component is carbon, wherein the carbon steel comprises between about 0.1% to about 2.1% by weight of carbon.

As used herein, the term "transporting" a material means moving a material, and/or allowing or causing a material to move from one location to another.

As used herein, "metal containment" means any container, conveyance, machine, device, or other object which holds and/or otherwise contacts a liquid or slurry. Non-limiting examples of metal containment include pipes and/or pipeline, tanks, railroad cars such as tank cars, tanker trucks, channels, launders, chutes, ducts, devices such as pumps, gauges, stopcocks, flowmeters, and/or combinations thereof. Non-limiting examples of liquid and/or slurry include crude oil, produced water, water sources, liquids comprising one or more corrodents, and mixtures thereof. Other examples of metal containment and liquids and slurries as are apparent to one of skill in the art are included.

As used herein, "pipe in fluid communication with a subterranean reservoir" and the like means a pipe in fluid communication with the subterranean reservoir and adapted to urge a fluid added to the pipe towards and into the reservoir by using gravitational force, by using mechanical means of urging, or by using both gravitational force and mechanical means of urging.

Discussion

It has been discovered that the inhibitor/cleaners of the invention are particularly effective at inhibiting corrosion of metal such as carbon steel at low concentrations while providing schmoo removal at those same concentrations.

First Embodiments of the Invention

In a first set of embodiments, there is provided a method of inhibiting corrosion comprising applying about 5 ppm to about 4000 ppm of an inhibitor/cleaner to a water source to produce an inhibitor/cleaner composition, wherein the inhibitor/cleaner is substantially soluble in the water source and comprises, consists of, or consists essentially of one or more alkyldiphenyloxide disulfonates, each alkyldiphenyloxide disulfonate of the one or more alkyldiphenyloxide disulfonates having the formula (I), (II), (III), or (IV)

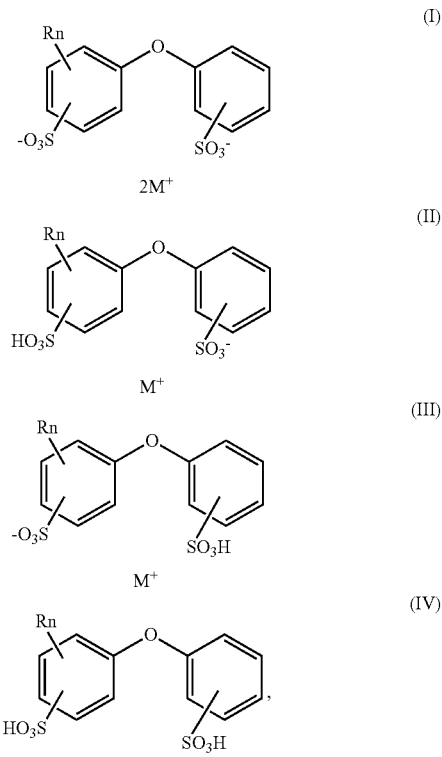

wherein R is a $C_6$ to $C_{22}$ alkyl group, n is 1 or 2, and $M^+$ is selected from the group consisting of $Na^+$, $K^+$, $NH_4^+$, primary ammonium, secondary ammonium, tertiary ammonium, and quaternary ammonium; and contacting a surface of a metal containment with the inhibitor/cleaner composition, wherein about 1% to about 100% of the area of the surface comprises a schmoo attached to the surface. In some embodiments, each alkyldiphenyloxide disulfonate of the one or more alkyldiphenyloxide disulfonates has the same $C_6$ to $C_{22}$ alkyl group. In other embodiments, the one or more alkyldiphenyloxide disulfonates comprises a mixture of compounds, each compound having the formula (I), (II), (III), or (IV) wherein R is a $C_6$ to $C_{22}$ alkyl group, but wherein the mixture of compounds includes at least two compounds differing from each other with respect to the chemical structure of its $C_6$ to $C_{22}$ R groups. In some such embodiments, two of the at least two compounds differ from each other with respect to the number of carbon atoms in the $C_6$ to $C_{22}$ alkyl group of each. In other such embodiments, two of the at least two compounds differ from each other with respect to the arrangement of carbon atoms in the $C_6$ to $C_{22}$ alkyl group of each. In still other such embodiments, two of the at least two compounds differ from each other with respect to the number of carbon atoms in the $C_6$ to $C_{22}$ alkyl group of each and with respect to the arrangement of carbon atoms in the $C_6$ to $C_{22}$ alkyl group of each.

In first embodiments, the metal containment comprises or consists essentially of iron. In embodiments, the metal containment comprises, consists of, or consists essentially of steel. In embodiments, the metal containment comprises, consists of, or consists essentially of carbon steel.

In some first embodiments, the applying comprises, consists of, or consists essentially of applying between about 5 and about 3000 ppm of the inhibitor/cleaner. In embodiments, the applying comprises, consists of, or consists essentially of applying between about 500 and about 2000 ppm of the inhibitor/cleaner. In embodiments, the applying comprises, consists of, or consists essentially of applying between about 750 and about 1500 ppm of the inhibitor/cleaner. In embodiments, the applying comprises, consists of, or consists essentially of applying between about 10 and about 500 ppm of the inhibitor/cleaner. In embodiments, the applying comprises applying between about 500 ppm and about 2000 ppm of the inhibitor/cleaner, wherein the inhibitor/cleaner composition inhibits corrosion of the metal containment and removes between about 10 wt % and about 100 wt % of the schmoo within about four hours. In some embodiments, the schmoo is in contact with a substantially stationary body of the inhibitor/cleaner composition. In other embodiments, the schmoo is contacted with a stream of the inhibitor cleaner composition. In some such embodiments, the contacting the surface of the metal containment comprises or consists of passing a stream of the inhibitor/cleaner composition over the schmoo in a direction substantially parallel to the surface of the metal containment. In some such embodiments, the stream of the inhibitor cleaner passes over the schmoo at an average fluid velocity of about 0.1 meters per minute (m/min) to about 50 m/min, in embodiments about 0.1 m/min to about 10 m/min, in embodiments about 0.1 m/min to about 1 m/min, in embodiments about 0.1 m/min to about 10 m/min, in embodiments about 0.5 m/min to about 10 m/min, in embodiments about 5 m/min to about 40 m/min, in embodiments about 1 m/min to about 40 m/min, in embodiments about 0.1 m/min to about 40 m/min, in embodiments about 50 m/min to about 500 m/min, or in embodiments about 10 m/min to about 300 m/min. In this context, "over the schmoo" means that the schmoo is contacted by a flow of the inhibitor cleaner composition, wherein the primary direction of the flow is parallel or substantially parallel to surface of the metal containment and the area of the surface. In this context, "primary direction of flow" and the like refers to the net flow or movement of the volume of the liquid.

In some embodiments, the inhibitor cleaner consists of or consists essentially of the one or more alkyldiphenyloxide disulfonates. In other embodiments, the inhibitor cleaner comprises, consists of, or consists essentially of water and the one or more alkyldiphenyloxide disulfonates. In some embodiments, the concentration by weight of the one or more alkyldiphenyloxide disulfonates in the inhibitor cleaner is about 1% to about 99%, in embodiments about 5% to about 90%, in embodiments about 5% to about 90%, in embodiments about 10% to about 80%, in embodiments about 20% to about 80%, in embodiments about 30% to about 80%, in embodiments about 40% to about 75%, or in embodiments about 45% to about 70%.

In embodiments, the concentration of the one or more alkyldiphenyloxide disulfonates in the inhibitor cleaner composition is about 10 ppm to about 5000 ppm, in embodiments about 20 ppm to about 3000 ppm, in embodiments about 20 ppm to about 3000 ppm, in embodiments about 20 ppm to about 2000 ppm, in embodiments about 20 ppm to about 1500 ppm, in embodiments about 30 ppm to about 1000 ppm, in embodiments about 40 to about 1000 ppm, in embodiments about 100 ppm to about 1500 ppm, in embodiments about 300 ppm to about 1500 ppm, in embodiments about 300 ppm to about 1000 ppm, in embodiments about 500 ppm to about 1500 ppm, in embodiments about 500 ppm to about 2000 ppm, or in embodiments about 500 ppm to about 3000 ppm.

In first embodiments, the metal containment comprises a pipe, a tank, a device, or combinations thereof, wherein the device is selected from a valve, a tap, a pressure gauge, a flowmeter, a stopcock, a pump, or combinations thereof.

In first embodiments, applying the inhibitor/cleaner to the water source includes mixing the inhibitor/cleaner with the water source, introducing a flow of the inhibitor/cleaner to a flow of the water source, introducing a flow of the inhibitor/cleaner to a layer of the water source, introducing a flow of the water source to a layer of the inhibitor/cleaner, laying a layer of the inhibitor/cleaner on a layer of the water source, laying a layer of the water source onto a layer of the inhibitor/cleaner, impinging a jet of the inhibitor/cleaner on the water source, and/or impinging a jet of the water source on the inhibitor/cleaner. Various methods of applying the inhibitor/cleaner to the water source will be evident to one of skill, and include applying the water source to an inhibitor/cleaner. Applying about 5 ppm to about 4000 ppm of an inhibitor/cleaner to a water source means applying about 5 ppm to about 4000 ppm by weight of inhibitor/cleaner to a water source. In embodiments, applying the inhibitor/cleaner composition to a water source comprises, consists of, or consists essentially of mixing the inhibitor/cleaner with the water source, dissolving the inhibitor/cleaner in the water source, or otherwise entraining the inhibitor/cleaner in the water source. In embodiments, the applying is batch-wise in one or more batches, wherein a particular quantity of the first material is added in a first batch to a second material; or in other embodiments the applying is continuous, wherein the first material is added continuously to a second material.

In first embodiments, the ammonium has the formula $NR_aAr_bX_cY_dH_e$, wherein a, b, c, d are individually 0-4, and a+b+c+d+e=4; and wherein R is an alkyl group, Ar is an aryl group, X is an alkaryl group, Y is an aralkyl group, and H is hydrogen atom.

In first embodiments, the surface of the metal containment is the interior surface of a cylindrical metal pipe, the bottom of a tank, one or more sides of the tank, or combinations thereof. In embodiments, the tank is a storage tank, a tank which is part of a vehicle such as a railroad tank car or part of a tanker truck. In embodiments, the surface comprises a schmoo attached to the surface. In embodiments, about 1% to about 100% of the area of the surface comprises a schmoo attached to the surface, in embodiments about 5% to 95% of the surface comprises a schmoo attached thereto, in embodiments about 10% to about 90% of the surface comprises a schmoo attached thereto, in embodiments, about 20% to about 80% of the surface comprises a schmoo attached thereto, in embodiments, about 30% to about 70% of the surface comprises a schmoo attached thereto, in embodiments about 40% to about 60% of the surface comprises a schmoo attached thereto, in embodiments, about 1% to about 10% of the surface comprises a schmoo attached thereto, in embodiments, about 80% to about 90% of the surface comprises a schmoo attached thereto, or in embodiments, about 90% to about 100% of the surface comprises a schmoo attached thereto.

In first embodiments, the inhibitor/cleaner composition inhibits corrosion of the metal containment and removes about 0.1 wt % to about 1 wt % of the schmoo, or in embodiments at least 2 wt % of the schmoo, or in embodiments at least 4 wt % of the schmoo, or in embodiments at least 6 wt % of the schmoo, or in embodiments, or at least 10 wt % of the schmoo within about four hours. In some such first embodiments, the contacting the surface of the metal containment comprises or consists of passing a stream of the inhibitor/cleaner composition over the schmoo in a direction substantially parallel to the surface of the metal containment. In some such embodiments, the stream of the inhibitor cleaner passes over the schmoo at an average fluid velocity of about 0.1 meters per minute (m/min) to about 50 m/min, in embodiments about 0.1 m/min to about 10 m/min, in embodiments about 0.1 m/min to about 1 m/min, in embodiments about 0.1 m/min to about 10 m/min, in embodiments about 0.5 m/min to about 10 m/min, in embodiments about 5 m/min to about 40 m/min, in embodiments about 1 m/min to about 40 m/min, in embodiments about 0.1 m/min to about 40 m/min, in embodiments about 50 m/min to about 500 m/min, or in embodiments about 10 m/min to about 300 m/min. In this context, "over the schmoo" means that the schmoo is contacted by a flow of the inhibitor cleaner composition, wherein the primary direction of the flow is parallel or substantially parallel to surface of the metal containment and the area of the surface. In this context, "primary direction of flow" and the like refers to the net flow or movement of the volume of the liquid.

In some first embodiments, the surface of the metal containment is contacted with the inhibitor/cleaner composition for about 1 minute to about 60 minutes. In embodiments, contacting a surface of the metal containment with the inhibitor/cleaner composition includes introducing the inhibitor/cleaner composition to a tank comprising metal, wherein at least a part of the inhibitor/cleaner is in contact with at least part of the metal; introducing an inhibitor/cleaner composition to a pipe comprising metal, wherein the inhibitor/cleaner composition flows in the pipe or sits in the pipe, and wherein at least part of the inhibitor/cleaner composition is in contact with at least part of the metal; or introducing the inhibitor/cleaner composition into a device comprising metal, wherein at least part of the inhibitor/cleaner composition is in contact with at least part of the metal. Non limiting examples of "introducing an inhibitor/cleaner composition to" include pouring, pumping, spraying, or dropping a inhibitor/cleaner composition into, onto, through, underneath, at the aside of, or around. In embodiments, the surface of the metal containment is contacted with the inhibitor/cleaner composition for about 1 hour to about 24 hours. In embodiments, the surface of the metal containment is contacted with the inhibitor/cleaner composition for about 1 hour to about 10 hours. In embodiments, the surface of the metal containment is contacted with the inhibitor/cleaner composition for about 1 hour to about 8 hours. In embodiments, the surface of the metal containment is contacted with the inhibitor/cleaner composition for about 1 hour to about 6 hours. In embodiments, the surface of the metal containment is contacted with the inhibitor/cleaner composition for about 1 hour to about 4 hours. In embodiments, the surface of the metal containment is contacted with the inhibitor/cleaner composition for about 1 day to about 30 days. In embodiments, the surface of the metal containment is contacted with the inhibitor/cleaner composition for about 7 days to about 30 days. In embodiments, the surface of the metal containment is contacted with the inhibitor/cleaner composition continuously, wherein the inhibitor/cleaner composition flows over the surface of the metal containment. In embodiments, the surface of the metal containment is contacted with the inhibitor/cleaner composition continuously, wherein the metal containment is a pipe and the inhibitor/cleaner composition flows over the surface of the metal containment.

Second Embodiments of the Invention

In a second set of embodiments, the method of the first set of embodiments further comprises recovering a crude oil/produced water from a subterranean reservoir; and separating the crude oil/produced water to provide the produced water and a crude oil. The crude oil/produced water is a mixture of crude oil and produced water. The separating the crude oil/produced water to form the produced water and a crude oil means separating two or more phases of the crude oil/produced water, wherein one of the phases is a substantially aqueous phase comprising the produced water and one of the phases is a substantially hydrophobic phase comprising the crude oil. The separating is performed according to any one of the means known in the art, and optionally additionally further comprises removing minor amounts of hydrocarbon from the substantially aqueous phase and/or removing minor amounts of aqueous composition from the substantially hydrophobic phase.

Therefore in second embodiments, there is provided a method comprising: recovering a crude oil/produced water from a subterranean reservoir; separating the crude oil/produced water to provide a produced water and a crude oil; applying about 5 ppm to about 4000 ppm of an inhibitor/cleaner to the produced water to produce an inhibitor/cleaner composition, wherein the inhibitor/cleaner is substantially soluble in the produced water, and wherein the inhibitor/cleaner comprises, consists of, or consists essentially of one or more alkyldiphenyloxide disulfonates, each alkyldiphenyloxide disulfonate of the one or more alkyldiphenyloxide disulfonates having the formula:

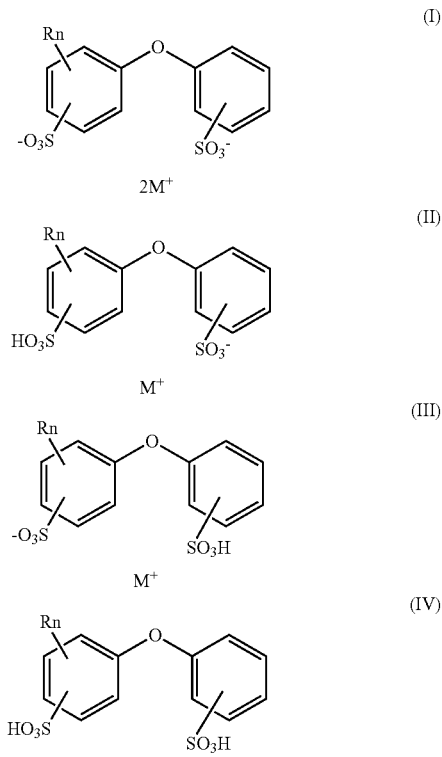

or mixtures thereof, wherein R is a $C_6$ to $C_{22}$ alkyl group, n is 1 or 2, and $M^+$ is selected from the group consisting of $Na^+$, $K^+$, $NH_4^+$, primary ammonium, secondary ammonium, tertiary ammonium, and quaternary ammonium; and contacting a surface of a metal containment with the inhibitor/cleaner composition, wherein about 1% to about 100% of the area of the surface comprises a schmoo attached to the surface. In some embodiments, each alkyldiphenyloxide disulfonate of the one or more alkyldiphenyloxide disulfonates has the same $C_6$ to $C_{22}$ alkyl group. In other embodiments, the one or more alkyldiphenyloxide disulfonates comprises a mixture of compounds, each compound having the formula (I), (II), (III), or (IV) wherein R is a $C_6$ to $C_{22}$ alkyl group, but wherein the mixture of compounds includes at least two compounds differing from each other with respect to the chemical structure of its $C_6$ to $C_{22}$ R groups. In some such embodiments, two of the at least two compounds differ from each other with respect to the number of carbon atoms in the $C_6$ to $C_{22}$ alkyl group of each. In other such embodiments, two of the at least two compounds differ from each other with respect to the arrangement of carbon atoms in the $C_6$ to $C_{22}$ alkyl group of each. In still other such embodiments, two of the at least two compounds differ from each other with respect to the number of carbon atoms in the $C_6$ to $C_{22}$ alkyl group of each and with respect to the arrangement of carbon atoms in the $C_6$ to $C_{22}$ alkyl group of each.

In embodiments, the method further comprises after the contacting reinjecting an injectate comprising the inhibitor/cleaner composition into a pipe in fluid communication with the subterranean reservoir and recovering a crude oil/recycled produced water from the subterranean reservoir. In embodiments, R is a $C_{10}$ to $C_{12}$ linear or branched alkyl group.

In second embodiments, the applying comprises, consists of, or consists essentially of applying between about 5 and about 3000 ppm of the inhibitor/cleaner. In embodiments, the applying comprises, consists of, or consists essentially of applying between about 500 and about 2000 ppm of the inhibitor/cleaner. In embodiments, the applying comprises, consists of, or consists essentially of applying between about 750 and about 1500 ppm of the inhibitor/cleaner. In embodiments, the applying comprises, consists of, or consists essentially of applying between about 10 and about 500 ppm of the inhibitor/cleaner. In embodiments, the applying comprises applying between about 500 ppm and about 2000 ppm of the inhibitor/cleaner, wherein the inhibitor/cleaner composition inhibits corrosion of the metal containment and removes between about 10 wt % and about 100 wt % of the schmoo within about four hours. In some such embodiments, the contacting the surface of the metal containment comprises or consists of passing a stream of the inhibitor/cleaner composition over the schmoo in a direction substantially parallel to the surface of the metal containment. In some such embodiments, the stream of the inhibitor cleaner passes over the schmoo at an average fluid velocity of about 0.1 meters per minute (m/min) to about 50 m/min, in embodiments about 0.1 m/min to about 10 m/min, in embodiments about 0.1 m/min to about 1 m/min, in embodiments about 0.1 m/min to about 10 m/min, in embodiments about 0.5 m/min to about 10 m/min, in embodiments about 5 m/min to about 40 m/min, in embodiments about 1 m/min to about 40 m/min, in embodiments about 0.1 m/min to about 40 m/min, in embodiments about 50 m/min to about 500 m/min, or in embodiments about 10 m/min to about 300 m/min. In this context, "over the schmoo" means that the schmoo is contacted by a flow of the inhibitor cleaner composition, wherein the primary direction of the flow is parallel or substantially parallel to surface of the metal containment and the area of the surface. In this context, "primary direction of flow" and the like refers to the net flow or movement of the volume of the liquid.

In some second embodiments, the inhibitor cleaner consists of or consists essentially of the one or more alkyldiphenyloxide disulfonates. In other second embodiments, the inhibitor cleaner comprises, consists of, or consists essentially of water and the one or more alkyldiphenyloxide disulfonates. In some embodiments, the concentration by weight of the one or more alkyldiphenyloxide disulfonates in the inhibitor cleaner is about 1% to about 99%, in embodiments about 5% to about 90%, in embodiments about 5% to about 90%, in embodiments about 10% to about 80%, in embodiments about 20% to about 80%, in embodiments about 30% to about 80%, in embodiments about 40% to about 75%, or in embodiments about 45% to about 70%.

In embodiments, the concentration of the one or more alkyldiphenyloxide disulfonates in the inhibitor cleaner composition is about 10 ppm to about 5000 ppm, in embodiments about 20 ppm to about 3000 ppm, in embodiments about 20 ppm to about 3000 ppm, in embodiments about 20 ppm to about 2000 ppm, in embodiments about 20 ppm to about 1500 ppm, in embodiments about 30 ppm to about 1000 ppm, in embodiments about 40 to about 1000 ppm, in embodiments about 100 ppm to about 1500 ppm, in embodiments about 300 ppm to about 1500 ppm, in embodiments about 300 ppm to about 1000 ppm, in embodiments about 500 ppm to about 1500 ppm, in embodiments about 500 ppm to about 2000 ppm, or in embodiments about 500 ppm to about 3000 ppm.

In second embodiments, the metal containment comprises a pipe, a tank, a device, or combinations thereof, wherein the device is selected from a valve, a tap, a pressure gauge, a flowmeter, a stopcock, a pump, or combinations thereof.

Third Embodiments of the Invention

In a third set of embodiments, there is provided an inhibitor/cleaner composition comprising one or more alkyldiphenyloxide disulfonates, each alkyldiphenyloxide disulfonate of the one or more alkyldiphenyloxide disulfonates having the formula (i), (II), (III), or (IV)

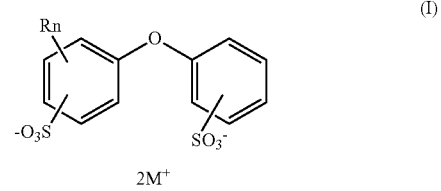

(I)

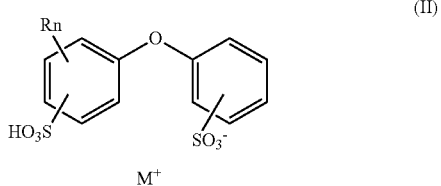

(II)

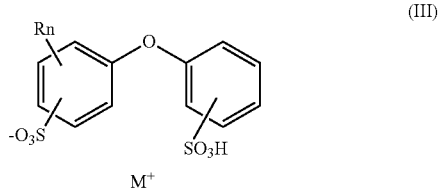

(III)

-continued

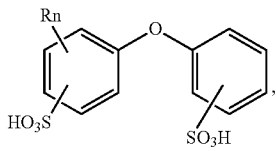
(IV)

wherein R is a $C_6$ to $C_{22}$ alkyl group, n is 1 or 2, and wherein $M^+$ is selected from the group consisting of $Na^+$, $K^+$, $NH_4^+$, primary ammonium, secondary ammonium, tertiary ammonium, and quaternary ammonium; and a water source, wherein the inhibitor/cleaner is soluble in the water source. In some such embodiments, R is a $C_{10}$ to $C_{12}$ alkyl group. In some such embodiments n is 1. In some embodiments, each alkyldiphenyloxide disulfonate of the one or more alkyldiphenyloxide disulfonates has the same $C_6$ to $C_{22}$ alkyl group. In other embodiments, the one or more alkyldiphenyloxide disulfonates comprises a mixture of compounds, each compound having the formula (I), (II), (III), or (IV) wherein R is a $C_6$ to $C_{22}$ alkyl group, but wherein the mixture of compounds includes at least two compounds differing from each other with respect to the chemical structure of the $C_6$ to $C_{22}$ R groups. In some such embodiments, two of the at least two compounds differ from each other with respect to the number of carbon atoms in the $C_6$ to $C_{22}$ alkyl group of each. In other such embodiments, two of the at least two compounds differ from each other with respect to the arrangement of carbon atoms in the $C_6$ to $C_{22}$ alkyl group of each. In still other such embodiments, two of the at least two compounds differ from each other with respect to the number of carbon atoms in the $C_6$ to $C_{22}$ alkyl group of each and with respect to the arrangement of carbon atoms in the $C_6$ to $C_{22}$ alkyl group of each. The one or more alkyldiphenyloxide disulfonates are substantially soluble in the water source. In embodiments, the ammonium has the formula $NR_aAr_bX_cY_dH_e$, wherein a, b, c, d are individually 0-4, and a+b+c+d+e=4; and wherein R is an alkyl group, Ar is an aryl group, X is alkaryl group, Y is an aralkyl group, and H is a hydrogen atom.

In some embodiments, the inhibitor cleaner consists of or consists essentially of the one or more alkyldiphenyloxide disulfonates. In other embodiments, the inhibitor cleaner comprises, consists of, or consists essentially of water and the one or more alkyldiphenyloxide disulfonates. In some embodiments, the concentration by weight of the one or more alkyldiphenyloxide disulfonates in the inhibitor cleaner is about 1% to about 99%, in embodiments about 5% to about 90%, in embodiments about 5% to about 90%, in embodiments about 10% to about 80%, in embodiments about 20% to about 80%, in embodiments about 30% to about 80%, in embodiments about 40% to about 75%, or in embodiments about 45% to about 70%.

In embodiments, the concentration of the one or more alkyldiphenyloxide disulfonates in the inhibitor cleaner composition is about 10 ppm to about 5000 ppm, in embodiments about 20 ppm to about 3000 ppm, in embodiments about 20 ppm to about 3000 ppm, in embodiments about 20 ppm to about 2000 ppm, in embodiments about 20 ppm to about 1500 ppm, in embodiments about 30 ppm to about 1000 ppm, in embodiments about 40 ppm to about 1000 ppm, in embodiments about 100 ppm to about 1500 ppm, in embodiments about 300 ppm to about 1500 ppm, in embodiments about 300 ppm to about 1000 ppm, in embodiments about 500 ppm to about 1500 ppm, in embodiments about 500 ppm to about 2000 ppm, or in embodiments about 500 ppm to about 3000 ppm.

Fourth Embodiments of the Invention

In a fourth set of embodiments, there is provided a metal containment assemblage comprising a metal containment and an inhibitor/cleaner composition, wherein the inhibitor/cleaner composition comprises one or more alkyldiphenyloxide disulfonates, each alkyldiphenyloxide disulfonate of the one or more alkyldiphenyloxide disulfonates having the formula (I), (II), (III), or (IV)

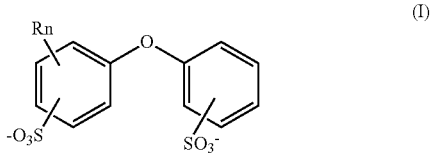
(I)

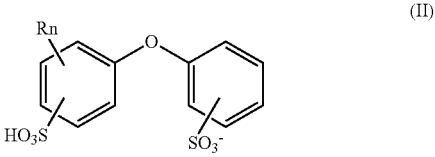
(II)

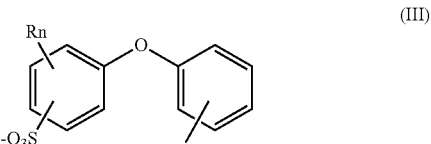
(III)

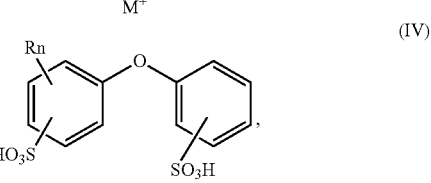
(IV)

wherein R is a $C_6$ to $C_{22}$ alkyl group, n is 1 or 2, and wherein $M^+$ is selected from the group consisting of $Na^+$, $K^+$, $NH_4^+$, primary ammonium, secondary ammonium, tertiary ammonium, and quaternary ammonium; and a water source, wherein the inhibitor/cleaner is soluble in the water source. In embodiments, R is a $C_{10}$ to $C_{12}$ linear or branched alkyl group. In embodiments, R is linear decyl. In embodiments, R is a branched dodecyl.

In some embodiments, each alkyldiphenyloxide disulfonate of the one or more alkyldiphenyloxide disulfonates has the same $C_6$ to $C_{22}$ alkyl group. In other embodiments, the one or more alkyldiphenyloxide disulfonates comprises a mixture of compounds, each compound having the formula (I), (II), (III), or (IV) wherein R is a $C_6$ to $C_{22}$ alkyl group, but wherein the mixture of compounds includes at least two compounds differing from each other with respect to the chemical structure of the $C_6$ to $C_{22}$ R groups. In some such embodiments, two of the at least two compounds differ from each other with respect to the number of carbon atoms in the $C_6$ to $C_{22}$ alkyl group of each. In other such embodiments, two of the at least two compounds differ from each other with respect to the arrangement of carbon atoms in the $C_6$ to $C_{22}$ alkyl group of each. In still other such embodiments, two of the at least two compounds differ from each other with respect to the number of carbon atoms in the $C_6$ to $C_{22}$ alkyl group of each and with respect to the arrangement of carbon atoms in the $C_6$ to $C_{22}$ alkyl group of each.

In the fourth embodiments, the inhibitor/cleaner composition is in contact with a surface of the metal containment. In, embodiments, about 1% to about 100% of the area of the surface of the metal containment comprises a schmoo attached to the surface. In embodiments, 1% to 100% of the area comprises a schmoo attached thereto. In embodiments, 5% to 95% of the area comprises schmoo attached thereto, in embodiments 1% to 10%, in embodiments 5% to 15%, in embodiments 10% to 25%, in embodiments 25% to 50%, in embodiments, 25% to 75%. In embodiments, the metal containment comprises carbon steel contacting the inhibitor/cleaner composition. In embodiments, the inhibitor/cleaner composition inhibits corrosion of the metal containment and removes between about 10 wt % and about 100 wt % of the schmoo, in embodiments 0 wt % to 5 wt % of the schmoo, in embodiments 1 wt % to 10 wt % of the schmoo, in embodiments 10 wt %-20 wt %, in embodiments 20 wt % to 30 wt %, in embodiments, 5 wt % to 15 wt %, in embodiments 10 wt % 90 wt %, in embodiments 20 wt % to 80 wt %, in embodiments 30 wt % to 70 wt %, or in embodiments, 40 wt % to 60 wt % of the schmoo within four hours. In some such embodiments, the contacting the surface of the metal containment comprises or consists of passing a stream of the inhibitor/cleaner composition over the schmoo in a direction substantially parallel to the surface of the metal containment. In some such embodiments, the stream of the inhibitor cleaner passes over the schmoo at an average fluid velocity of about 0.1 meters per minute (m/min) to about 50 m/min, in embodiments about 0.1 m/min to about 10 m/min, in embodiments about 0.1 m/min to about 1 m/min, in embodiments about 0.1 m/min to about 10 m/min, in embodiments about 0.5 m/min to about 10 m/min, in embodiments about 5 m/min to about 40 m/min, in embodiments about 1 m/min to about 40 m/min, in embodiments about 0.1 m/min to about 40 m/min, in embodiments about 50 m/min to about 500 m/min, or in embodiments about 10 m/min to about 300 m/min. In this context, "over the schmoo" means that the schmoo is contacted by a flow of the inhibitor cleaner composition, wherein the primary direction of the flow is parallel or substantially parallel to surface of the metal containment and the area of the surface. In this context, "primary direction of flow" and the like refers to the net flow or movement of the volume of the liquid.

In fourth embodiments, the concentration of the inhibitor/cleaner in the inhibitor/cleaner composition is between about 250 and about 3000 ppm. In embodiments, the concentration of the inhibitor/cleaner in the inhibitor/cleaner composition is between about 500 and about 2000 ppm. In embodiments, the concentration of the inhibitor/cleaner in the inhibitor/cleaner composition is between about 750 and about 1500 ppm. In embodiments, the metal containment comprises a pipe, a tank, a device, or combinations thereof, wherein the device is selected from a valve, a tap, a pressure gauge, a flowmeter, a stopcock, a pump, or combinations thereof.

In some embodiments, the inhibitor cleaner consists of or consists essentially of the one or more alkyldiphenyloxide disulfonates. In other embodiments, the inhibitor cleaner comprises, consists of, or consists essentially of water and the one or more alkyldiphenyloxide disulfonates. In some embodiments, the concentration by weight of the one or more alkyldiphenyloxide disulfonates in the inhibitor cleaner is about 1% to about 99%, in embodiments about 5% to about 90%, in embodiments about 5% to about 90%, in embodiments about 10% to about 80%, in embodiments about 20% to about 80%, in embodiments about 30% to about 80%, in embodiments about 40% to about 75%, or in embodiments about 45% to about 70%.

In embodiments, the concentration of the one or more alkyldiphenyloxide disulfonates in the inhibitor cleaner composition is about 10 ppm to about 5000 ppm, in embodiments about 20 ppm to about 3000 ppm, in embodiments about 20 ppm to about 3000 ppm, in embodiments about 20 ppm to about 2000 ppm, in embodiments about 20 ppm to about 1500 ppm, in embodiments about 30 ppm to about 1000 ppm, in embodiments about 40 to about 1000 ppm, in embodiments about 100 ppm to about 1500 ppm, in embodiments about 300 ppm to about 1500 ppm, in embodiments about 300 ppm to about 1000 ppm, in embodiments about 500 ppm to about 1500 ppm, in embodiments about 500 ppm to about 2000 ppm, or in embodiments about 500 ppm to about 3000 ppm.

Fifth Embodiments of the Invention

In a fifth set of embodiments, the invention is a use of an inhibitor/cleaner composition to remove a schmoo from a metal containment and inhibit corrosion thereof. In embodiments, the inhibitor/cleaner composition comprises one or more alkyldiphenyloxide disulfonates, each alkyldiphenyloxide disulfonate having the formula (I), (II), (III), or (IV)

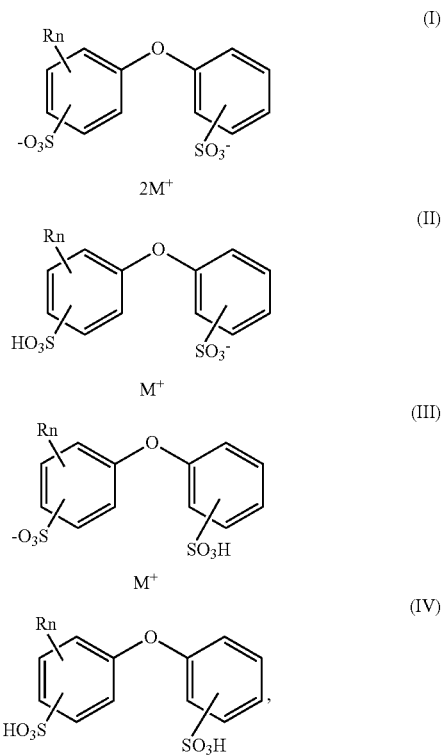

wherein R is a $C_6$ to $C_{22}$ alkyl group, n is 1 or 2, and wherein $M^+$ is selected from the group consisting of $Na^+$, $K^+$, $NH_4^+$, primary ammonium, secondary ammonium, tertiary ammonium, and quaternary ammonium; and a water source, wherein the inhibitor/cleaner is soluble in the water source. In embodiments, R is a $C_{10}$ to $C_{12}$ linear or branched alkyl group. In embodiments, R is decyl. In embodiments, R is dodecyl. In embodiments R is linear decyl. In embodiments, R is branched dodecyl. In some embodiments, each alkyldiphenyloxide disulfonate of the one or more alkyldiphenyloxide disulfonates has the same $C_6$ to $C_{22}$ alkyl group. In other embodiments, the one or more alkyldiphenyloxide disulfonates comprises a mixture of compounds, each compound having the formula (I), (II), (III), or (IV) wherein R is a $C_6$ to $C_{22}$ alkyl group, but wherein the mixture of compounds includes at least two compounds differing from each other with respect to the chemical structure of the $C_6$ to $C_{22}$ R groups. In some such embodiments, two of the at least two compounds differ from each other with respect to the number of carbon atoms in the $C_6$ to $C_{22}$ alkyl group of each. In other such embodiments, two of the at least two compounds differ from each other with respect to the arrangement of carbon atoms in the $C_6$ to $C_{22}$ alkyl group of each. In still other such embodiments, two of the at least two compounds differ from each other with respect to the number of carbon atoms in the $C_6$ to $C_{22}$ alkyl group of each and with respect to the arrangement of carbon atoms in the $C_6$ to $C_{22}$ alkyl group of each.

In fifth embodiments, the inhibitor/cleaner composition is in contact with a surface of a metal containment. In embodiments, about 1% to about 100% of the area of the surface of the metal containment comprises a schmoo attached to the surface. In embodiments, 5% to 95% of the area comprises schmoo, in embodiments 1% to 10%, in embodiments 5% to 15%, in embodiments 10% to 25%, in embodiments 25% to 50%, or in embodiments 25% to 75%.

In fifth embodiments, the metal containment comprises carbon steel contacting the inhibitor/cleaner composition. In embodiments, the inhibitor/cleaner composition inhibits corrosion of the metal containment and removes between about 10 wt % and about 100 wt % of the schmoo, in embodiments 0 wt % to 5 wt % of the schmoo, in embodiments 1 wt % to 10 wt % of the schmoo, in embodiments 10 wt %-20 wt %, in embodiments 20 wt % to 30 wt %, in embodiments, 5 wt % to 15 wt %, in embodiments 10 wt % 90 wt %, in embodiments 20 wt % to 80 wt %, in embodiments 30 wt % to 70 wt %, in embodiments, 40 wt % to 60 wt % of the schmoo within four hours. In some such embodiments, the contacting the surface of the metal containment comprises or consists of passing a stream of the inhibitor/cleaner composition over the schmoo in a direction substantially parallel to the surface of the metal containment. In some such embodiments, the stream of the inhibitor cleaner passes over the schmoo at an average fluid velocity of about 0.1 meters per minute (m/min) to about 50 m/min, in embodiments about 0.1 m/min to about 10 m/min, in embodiments about 0.1 m/min to about 1 m/min, in embodiments about 0.1 m/min to about 10 m/min, in embodiments about 0.5 m/min to about 10 m/min, in embodiments about 5 m/min to about 40 m/min, in embodiments about 1 m/min to about 40 m/min, in embodiments about 0.1 m/min to about 40 m/min, in embodiments about 50 m/min to about 500 m/min, or in embodiments about 10 m/min to about 300 m/min. In this context, "over the schmoo" means that the schmoo is contacted by a flow of the inhibitor cleaner composition, wherein the primary direction of the flow is parallel or substantially parallel to surface of the metal containment and the area of the surface. In this context, "primary direction of flow" and the like refers to the net flow or movement of the volume of the liquid.

In some fifth embodiments, the water source comprises, consist of, or consists essentially of produced water.

In fifth embodiments, the concentration of the inhibitor/cleaner in the inhibitor/cleaner composition is between about 250 and about 3000 ppm. In embodiments, the concentration of the inhibitor/cleaner in the inhibitor/cleaner composition is between about 500 and about 2000 ppm. In embodiments, the concentration of the inhibitor/cleaner in the inhibitor/cleaner composition is between about 750 and about 1500 ppm.

In some embodiments, the inhibitor cleaner consists of or consists essentially of the one or more alkyldiphenyloxide disulfonates. In other embodiments, the inhibitor cleaner comprises, consists of, or consists essentially of water and the one or more alkyldiphenyloxide disulfonates. In some embodiments, the concentration by weight of the one or more alkyldiphenyloxide disulfonates in the inhibitor cleaner is about 1% to about 99%, in embodiments about 5% to about 90%, in embodiments about 5% to about 90%, in embodiments about 10% to about 80%, in embodiments about 20% to about 80%, in embodiments about 30% to about 80%, in embodiments about 40% to about 75%, or in embodiments about 45% to about 70%.

In embodiments, the concentration of the one or more alkyldiphenyloxide disulfonates in the inhibitor cleaner composition is about 10 ppm to about 5000 ppm, in embodiments about 20 ppm to about 3000 ppm, in embodiments about 20 ppm to about 3000 ppm, in embodiments about 20 ppm to about 2000 ppm, in embodiments about 20 ppm to about 1500 ppm, in embodiments about 30 ppm to about 1000 ppm, in embodiments about 40 to about 1000 ppm, in embodiments about 100 ppm to about 1500 ppm, in embodiments about 300 ppm to about 1500 ppm, in embodiments about 300 ppm to about 1000 ppm, in embodiments about 500 ppm to about 1500 ppm, in embodiments about 500 ppm to about 2000 ppm, or in embodiments about 500 ppm to about 3000 ppm.

In fifth embodiments, the metal containment comprises a pipe, a tank, a device, or combinations thereof, wherein the device is selected from a valve, a tap, a pressure gauge, a flowmeter, a stopcock, a pump, or combinations thereof.

Water Source of any of the First, Second, Third, Fourth, and Fifth Embodiments

In particular embodiments of any of the first, second, third, fourth, or fifth embodiments described herein, the water source comprises, consists of, or consists essentially of a produced water.

In embodiments, the water source of any one or more of the first, second, third, fourth, and fifth embodiments comprises between 1000 ppm and 200000 ppm of chloride ions, and optionally ions selected from sodium ions, potassium ions, magnesium ions, calcium ions, ferrous ions, ferric ions, lead ions, barium ions, strontium ions, bicarbonate ions, sulfate ions, bromide ions, iodide ions, acetate ions, hydroxide ions, sulfide ions, hydrosulfide ions, or mixtures thereof. In some such embodiments, the water source comprises between 1000 ppm and 200000 ppm chloride ions and at least 100 ppm of divalent cations selected from the group consisting of $Mg^{2+}$, $Ca^{2+}$, $Fe^{2+}$, $Sr^{2+}$, and $Ba^{2+}$. In some such embodiments, the water source comprises from 100 to 300 ppm $Mg^{2+}$.

In any of the first, second, third, fourth, or fifth embodiments, the water source comprises, consists of, or consists essentially of produced water. In embodiments the produced water comprises from 1000 to 50000 ppm of chloride ions, 100 to 10000 ppm sodium ions, 5 to 10000 ppm potassium ions, 10 ppm to 2500 ppm magnesium ions, 0 ppm to 15000 ppm calcium ions, or any combination thereof.

In any of the first, second, third, fourth, and fifth embodiments, in embodiments the water source and/or the produced water comprises a total of 100 ppm to 15000 ppm multivalent cations, or in embodiments 100 ppm to 500 ppm, or in embodiments 100 ppm to 1000 ppm, or in embodiments 500 ppm to 15000 ppm, or in embodiments 1000 to 10000 ppm multivalent cations. In some such embodiments, the multivalent cations are selected from magnesium ions, calcium ions, ferrous ions, strontium ions, barium ions, copper ions, cobalt ions, manganese ions, nickel ions, zinc ions, aluminum ions, and any combination thereof. Surprisingly and unexpectedly, the inhibitor/cleaner of the invention and/or the one or more alkyldiphenyloxide disulfonates are functional when added to a water source, a water source comprising produced water, and/or a water source consisting of a produced water wherein the water source comprises more than 100 ppm multivalent cations by weight.

In any one or more of the first, second, third, fourth, or fifth embodiments, the one or more alkyldiphenyloxide disulfonates are substantially soluble in the water source. Here, "substantially soluble in the water source" means that between 70% and 100% by weight of the one or more alkyldiphenyloxide disulfonates dissolves in the water source directly and/or indirectly. In some such embodiments, the one or more alkyldiphenyloxide disulfonates are soluble or substantially soluble in produced water, wherein the water source comprises, consists of, or consists essentially of produced water. In some such embodiments, the produced water comprises In any one or more of the first, second, third, fourth, or fifth embodiments, between 70% and 100% by weight of the one or more alkyldiphenyloxide disulfonates is soluble in the water source either directly and/or indirectly, in embodiments, 75% to 100%, in embodiments, 85% to 100%, in embodiments 95% to 100%, in embodiments 90% to 99%, in embodiments, 90% to 98%, in embodiments, 90% to 97%, in embodiments 90% to 96%, in embodiments 95% to 99%, in embodiments, 95% to 98%, in embodiments 95% to 97%, in embodiments 95% to 96%. In embodiments, the one or more alkyldiphenyloxide disulfonates are directly soluble in the water source: for example, the one or more alkyldiphenyloxide disulfonates consist or consist essentially of disodium salts that are soluble in water and/or the water source. In embodiments, the one or more alkyldiphenyloxide disulfonates are indirectly substantially soluble in the water source: for example, the one or more alkyldiphenyloxide disulfonates consist of or consist essentially of disulfonic acids, the water source has a pH of greater than about 7, and when the inhibitor/cleaner is applied to the water source the one or more alkyldiphenyloxide disulfonic acids react with one or more basic materials in the water source to produce one or more alkyldiphenyloxide disulfonate salts that are soluble and/or substantially soluble in the water source. In embodiments, the one or more alkyldiphenyloxide disulfonates are soluble both directly and indirectly, that is part of the one or more alkyldiphenyloxide disulfonates is alkyldiphenyloxide disulfonic acid and part is salt, and the acid and salt are both soluble and/or substantially soluble in the water source. The substantial solubility of the one or more alkyldiphenyloxide disulfonates in the water source enables and/or improves the corrosion inhibition of the one or more alkyldiphenyloxide disulfonates when water-borne, water-soluble, and otherwise aqueous corrodents are present in the water source.

In any one or more of the first, second, third, fourth, or fifth embodiments, the one or more alkyldiphenyloxide disulfonates are substantially soluble in water. Here, "substantially soluble in water" means that between 90% and 100% by weight of the one or more alkyldiphenyloxide disulfonates dissolves in water at 20° C.

In any one or more of the first, second, third, fourth, or fifth embodiments, between 95% and 100% by weight of the one or more alkyldiphenyloxide disulfonates are soluble in the water at 20° C., in embodiments 95% to 99%, in embodiments, 95% to 98%, in embodiments, 95% to 97%, in embodiments 95% to 96%, in embodiments 96% to 98%.

In any one or more of the first, second, third, fourth, or fifth embodiments, the one or more alkyldiphenyloxide disulfonates are substantially soluble in produced water. Here, "substantially soluble in produced water" means that between 70% and 100% by weight of the one or more alkyldiphenyloxide disulfonates dissolves in the produced water directly and/or indirectly.

In any one or more of the first, second, third, fourth, or fifth embodiments, between 70% and 100% by weight of the one or more alkyldiphenyloxide disulfonates are soluble in the produced water either directly and/or indirectly, in embodiments, 75% to 100%, in embodiments, 85% to 100%, in embodiments 95% to 100%, in embodiments 90% to 99%, in embodiments, 90% to 98%, in embodiments, 90% to 97%, in embodiments 90% to 96%, in embodiments 95% to 99%, in embodiments, 95% to 98%, in embodiments 95% to 97%, in embodiments 95% to 96%. In embodiments, the one or more alkyldiphenyloxide disulfonates are directly soluble in the produced water: for example, the one or more alkyldiphenyloxide disulfonates comprise one or more disodium salts which are soluble in water and/or the produced water. In embodiments, the one or more alkyldiphenyloxide disulfonates are indirectly substantially soluble in the produced water: for example, the one or more alkyldiphenyloxide disulfonates comprise one or more disulfonic acids, the produced water has a pH of greater than about 7, and when the inhibitor/cleaner is applied to the produced water the one or more disulfonic acids react with one or more basic materials in the produced water to form one or more alkyldiphenyloxide disulfonate salts that are soluble or substantially soluble in the produced water. In embodiments, the one or more alkyldiphenyloxide disulfonates are soluble both directly and indirectly in the produced water, i.e. part of the one or more alkyldiphenyloxide disulfonates is alkyldiphenyloxide disulfonic acid and part is a salt, and the acid and salt are both soluble and/or substantially soluble in the water source. The substantial solubility of the one or more alkyldiphenyloxide disulfonates in the produced water enables and/or improves the corrosion inhibition of the one or more alkyldiphenyloxide disulfonates when water-borne, water-soluble, and otherwise aqueous corrodents are present in the produced water.

In any one or more of the aforementioned first embodiments, second embodiments, third embodiments, fourth embodiments, or fifth embodiments, the water source comprises, consists of, or consists essentially of water and one or more corrodents. In embodiments, the water source is selected from produced water, injectate, effluent from mining, and effluent from paper production. In embodiments, the water source is a high total dissolved solids water source; a high-temperature water source; or a high total dissolved solids, high-temperature water source. In embodiments, the water source is produced water. In embodiments, the produced water comprises, consists of, or consists essentially of water, one or more corrodents, and minor (<5 wt. %) amounts of residual hydrocarbon products entrained therein. In embodiments, the produced water comprises connate, seawater, brackish water, residual hydrocarbons, a salt, a surfactant, an injectate, or a mixture thereof. In embodiments, produced water additionally comprises one or more surfactants, solvents, coupling agents, emulsifying agents (emulsifiers), demulsifying agents (demulsifiers), paraffin wax inhibitors, and mixtures of two or more thereof. Produced water ranges in temperature from about −30° C. to about 200° C., depending on the subterranean source and the terranean environment and infrastructure proximal to the subterranean source. In embodiments, the produced water is a high total dissolved solids water source wherein the total amount of dissolved solids is at least about 4 wt. % (40000 ppm) and as much as about 35 wt. % (350000 ppm).

An analysis of produced water from various locations of subterranean reservoirs reveals that the concentrations of ionic species varies widely across different geographic locations where subterranean reservoirs are located. A sampling of some ionic species from different produced waters is listed in Table 1. A produced water can have one or more of the following: more than about 24000 ppm Na content, more than about 2500 ppm Ca content, more than about 70000 ppm Cl content, more than about 100 ppm Ba content, more than about 50 ppm Fe content, more than about 500 ppm Mg content, and more than about 1500 ppm carbonate (carbonic acid equivalent) content.

TABLE 1

Concentrations of various ionic species in produced waters. Notably, "TOTAL" means all dissolved solids, including but not limited to the listed species. Blank = species not measured.

| Species | Marcellus Shale | Bakken | Wolfcamp (sample 1) | Wolfcamp (sample 2) | Permian Basin |
|---|---|---|---|---|---|
| Al | <20 | | | | |
| Ba | 2900 | | | | |
| Ca | 11000 | 13177 | 3660 | 5657 | 2993 |
| Cl | | 184500 | 71600 | 84610 | 71596 |
| Cr | <5 | | | | |
| Co | 49 | | | | |
| Cu | <5 | | | | |
| Fe | <75 | | | | |
| $HCO_3$ | | | 278 | 49 | |
| Mg | 940 | 1175 | 1350 | 2224 | 598 |
| Mn | <5 | | | | |
| Mo | <130 | | | | |
| Ni | <30 | | | | |
| K | 190 | 5643 | | | |
| $SO_4$ | | | 2350 | 1892 | 2028 |
| $SiO_2$ | <50 | | | | |
| Na | 24000 | 85322 | 40900 | 45060 | 42785 |
| Sr | 2300 | | | | |
| Ti | <75 | | | | |
| V | <10 | | | | |
| Zn | <20 | | | | |
| TOTAL | 110000 | 289817 | 120138 | 139492 | 120000 |

From an inspection of Table 1, it is clear that a produced water can have a variety of dissolved, dispersed, or otherwise entrained moieties which can accelerate the corrosion of metals such as carbon steel. The corrosion rate of a metal by produced water will depend on the location at which the produced water was obtained, the chemical composition of the produced water, especially the concentration and types of one or more corrodents entrained in the water, the type of metal contacted by the one or more corrodents, the degree and particular characteristics of any corrosion already existing in or on the metal, amount of each corrodent, type and amount of corrosion inhibitor, type and amount of entrained gasses, passivating or protective layers or coatings present on the metal surface contacting the one or more corrodents, and/or a number of other factors as will be apparent to one of skill.

In any of the first embodiments, second embodiments, third embodiments, fourth embodiments, or fifth embodiments disclosed herein, the water source comprises, consists of, or consists essentially of produced water, wherein the produced water is saturated with carbon dioxide. In embodiments, the produced water is saturated with hydrogen sulfide. In embodiments, the produced water is saturated with both carbon dioxide and hydrogen sulfide.

In any one or more of the first embodiments, second embodiments, third embodiments, fourth embodiments, or fifth embodiments disclosed herein, the water source comprises one or more corrodents, wherein the one or more corrodents comprises, consists essentially of, or consists of carbon dioxide, hydrogen sulfide, organosulfur compounds, metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, lead ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof. In embodiments, the one or more corrodents comprises insoluble particulates such as metal oxides, sands, clays, silicon dioxide, titanium dioxide, muds, and other insoluble inorganic and/or organic particulates, which in embodiments act as abrasives when entrained in a water flow contacting a metal. In embodiments, the one or more corrodents comprises, consists of, or consists essentially of an oxidizing agent. In embodiments, the corrodent comprises, consists of, or consists essentially of a chelating agent. In embodiments, the corrodent comprises an alcohol. In embodiments, the corrodent comprises an organochlorine compound. In embodiments, the produced water comprises, between 1000 ppm and 200000 ppm of chloride ions. In embodiments, the one or more corrodents comprises, consists of, or consists essentially of an acid. In embodiments, the one or more corrodents comprises, consists of, or consists essentially of an alkali.

In any of the first embodiments, second embodiments, third embodiments, fourth embodiments, or fifth embodiments, the pH of the water source is between 7 and 14. In embodiments, the pH of the water source is between about 7 and about 10. In embodiments, the pH of the water source is between about 10 and 14. In embodiments, the pH of the water source is between about 9 and about 11. In embodiments, the pH of the water source is between about 7 and about 8. In embodiments, the pH of the water source is between about 8 and about 9. In embodiments, the pH of the water source is between about 9 and about 10. In embodiments, the pH of the water source is between about 10 and about 11. In embodiments, the pH of the water source is between about 11 and about 12. In embodiments, the pH of the water source is between about 12 and about 13. In embodiments, the pH of the water source is between about 13 and 14. In embodiments, the pH of the water source is between 0 and 7. In embodiments, the pH of the water source is between about 1 and about 6. In embodiments, the pH of the water source is between 5 and 6. In embodiments, the pH of the water source is between 4 and 5. In embodiments, the pH of the water source is between 3 and 4. In embodiments, the pH of the water source is between 2 and 3. In embodiments, the pH of the water source is between 1 and 2. In embodiments, the pH of the water source is between 0 and 1.

EXAMPLES

The synthetic Ivishak brine used in the Examples was made up according to the composition listed in Table 2:

TABLE 2

Concentrations of ions in the Ivishak brine used in examples herein

| Ion | ppm of ion in water |
| --- | --- |
| $Na^+$ | 8659 |
| $K^+$ | 134 |
| $Mg^{2+}$ | 234 |
| $Ca^{2+}$ | 0 |
| $Fe_2^+$ | 0 |
| $Sr^{2+}$ | 18 |
| $Ba^{2+}$ | 1.1 |
| $HCO_3^-$ | 1795 |
| $Cl^-$ | 13649 |
| $SO_4^{2-}$ | 0 |
| $Br^-$ | 0 |
| $I^-$ | 0 |
| $CH_3CO_2^-$ | 0 |

Example 1

Carbon steel coupons (0.875 inches×5 inches) made of 1018 carbon steel were prepared as follows: Each coupon was cleaned on both major sides by scrubbing the coupon with a commercial dishwashing detergent, ECOLAB® PANTASTIC™, with an abrasive sponge; rinsed with deionized water followed by acetone; and wiped clean with a towel. The clean and dry coupon was weighed and the weight recorded. The schmoo used was the heptane-insoluble but toluene-soluble fraction of crude oil available from Prudhoe Bay Ak., a fraction containing iron sulfide, sand, asphaltenes, and crude oil. Approximately 0.95 g of the schmoo was coated on one major side of each coupon using a spatula, approximately 0.875 inches of each end of the five-inch side being left free of the schmoo. The schmoo-coated coupon was then reweighed and the weight recorded.

Example 2

A corrosion inhibition/schmoo removal loop test was conducted on a schmoo-coated coupon prepared in Example 1. The coupon was inspected visually, and its appearance was recorded. The coupon was placed lengthwise into a plastic tube angled at approximately 45 degrees, and both ends of the plastic tube were attached to a tube loop that included a sump and a pump. The sump was filled with about 1500 mL to 1750 mL of Ivishak brine heated to about 60° C. (about 140° F.). The brine in the sump was then heated to 158° F., and circulated through the loop. The brine, flowing over the schmoo-coated coupon, was pumped through the plastic tube at a rate of approximately 3 gallons per minute for four hours. After four hours, the pump was stopped, the tube and tubing were drained back into the sump, and the coupon was visually inspected, and its degree of corrosion as judged by appearance was rated on a scale of 0 to 5, with 5 representing the worst corrosion and 0 representing no observed corrosion. Results are given in Table 3.

Examples 3-9

A series of corrosion inhibition/schmoo removal loop tests was conducted on further schmoo-coated coupons prepared in Example 1. Each schmoo-coated coupon was inspected visually and its appearance and weight recorded. The coupon was placed lengthwise into a plastic tube angled at approximately 45 degrees, and both ends of the plastic tube were attached to a tube loop that included a sump and a pump.

Various brine compositions were made by mixing inhibitor/cleaner in the amounts displayed in Table 3 into Ivishak brine. Industrial Corrosion Inhibitor/Cleaner A is a commercially available corrosion inhibitor and cleaner for aqueous systems for the oil industry. The sump was filled with about 1500 mL to 1750 mL of the brine composition heated to about 60° C. (about 140° F.). The composition in the sump was then heated to about 70° C. (about 158° F.), and circulated through the loop. The brine composition, flowing over the schmoo-coated coupon, was pumped through the plastic tube at a rate of approximately 3 gallons per minute for four hours. After four hours, the pump was stopped, and the tube and tubing were drained into the sump. The coupon was rinsed with deionized water and allowed to dry. The coupon was weighed and inspected visually, and the degree of corrosion as judged visually was recorded on a scale of 0 to 5 as in Example 2.

TABLE 3

Corrosion inhibition tests

| Example | Brine composition | Corrosion rating |
| --- | --- | --- |
| Example 1 | None | 0 |
| Example 2 | Ivishak brine | 5 |
| Example 3 | 100 ppm Industrial Corrosion Inhibitor/Cleaner A in Ivishak Brine | 4 |
| Example 4 | 50 ppm DOWFAX ™ C10L in Ivishak brine | 4 |
| Example 5 | 100 ppm DOWFAX C10L in Ivishak brine | 4 |
| Example 6 | 1000 ppm DOWFAX C10L in Ivishak brine | 1 |
| Example 7 | 50 ppm CALFAX ® DBA-70 in Ivishak brine | 4 |
| Example 8 | 100 ppm CALFAX DBA-70 in Ivishak brine | 4 |
| Example 9 | 1000 ppm CALFAX DBA-70 in Ivishak brine | 2 |

The results in Table 3 show that the degree of corrosion when exposed to the Ivishak brine was lower the higher the concentration of DOWFAX or CALFAX. In Examples 8 and 9, it was noted that the sump appeared to take on some hydrocarbonous residue due to schmoo removal from the coupon. In the case of Example 9, the sump solution at the end of the run was slightly translucent with an RGB value of approximately (118, 95, 54: a shade of brown).

Examples 10-12

Stagnant bottle tests were effected. Three 1018 carbon steel coupons (each being 0.875 inches×5 inches) were cleaned on both major sides by scrubbing the coupon with a commercial dishwashing detergent, ECOLAB® PANTASTIC™, with an abrasive sponge; rinsed with deionized water followed by acetone; and wiped clean with a towel.

Three inhibitor/cleaner compositions were prepared by mixing an amount of DOWFAX C10L in Ivishak brine, as shown in Table 4. Each of three bottles approximately cylindrical and less than 5 inches wide was filled to a level of about 2.5 inches with a different inhibitor/cleaner composition. A clean and dry coupon was placed long-axis approximately vertical in each bottle such that about half of the coupon was immersed in the inhibitor/cleaner. The bottles were placed in an oven at about 60° C. (about 140° F.). The three bottles were removed after one day, five days, and eleven days, and inspected for appearance and corrosion of the coupon as adjudged by the appearance and rated on a scale of 0-5, as with Examples 2-9. Results are recorded in Table 4.

TABLE 4

Stagnant bottle tests

| Example | Amount of DOWFAX ™ C10L by weight of Ivishak brine | Corrosion after | | |
|---|---|---|---|---|
| | | 1 day | 5 days | 11 days |
| Example 10 | 0 ppm | 1 | 3 | 5 |
| Example 11 | 50 ppm | 1 | 2 | 4.5 |
| Example 12 | 1000 ppm | 0 | 1.5 | 3 |

The results in Table 4 show that as the concentration of DOWFAX C10L was increased in the brine, the rate of corrosion of the carbon steel coupons decreased. This was seen when comparing the results from day 1, 5 and 11 for each of the three tested compositions.

What is claimed is:

1. A method of inhibiting corrosion comprising:
    applying about 5 ppm to about 4000 ppm of an inhibitor/cleaner to a water source to produce an inhibitor/cleaner composition, wherein the water source comprises a produced water, wherein the inhibitor/cleaner is substantially soluble in the water source and comprises one or more alkyldiphenyloxide disulfonates, wherein each of the one or more alkyldiphenyloxide disulfonates has the formula (I), (II), (III), or (IV)

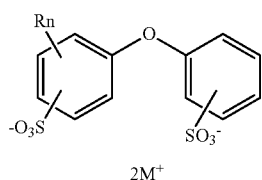

(I)

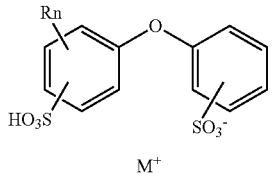

(II)

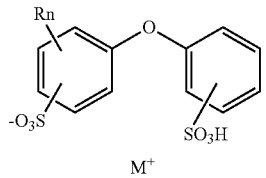

(III)

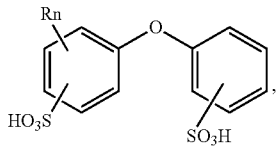

(IV)

wherein R is a dodecyl group, n is 1 or 2, and $M^+$ is selected from $Na^+$, $K^+$, $NH_4^+$, primary ammonium, secondary ammonium, tertiary ammonium, and quaternary ammonium; and contacting a surface of a metal containment with the inhibitor/cleaner composition, wherein about 1% to about 100% of the area of the surface comprises a schmoo attached to the surface, and wherein the inhibitor/cleaner composition inhibits corrosion of the metal containment and removes between about 10 wt % and about 100 wt % of the schmoo within four hours.

2. The method of claim 1 further comprising before the applying:
    recovering a crude oil/produced water from a subterranean reservoir; and
    separating the crude oil/produced water to provide the produced water and a crude oil.

3. The method of claim 1, further comprising after the contacting:
    reinjecting an injectate comprising the inhibitor/cleaner composition into a pipe in fluid communication with a subterranean reservoir; and
    recovering a crude oil/recycled produced water from the subterranean reservoir.

4. The method of claim 1, wherein the metal containment comprises a carbon steel.

5. The method of claim 1, wherein the applying consists of applying between about 500 and about 2000 ppm of the inhibitor/cleaner to the water source, and wherein the concentration of the one or more alkyldiphenyloxide disulfonates in the inhibitor cleaner is from about 40% to about 75% by weight.

6. The method of claim 1, wherein the produced water comprises connate, seawater, brackish water, residual hydrocarbons, a salt, a surfactant, an injectate, or any combination thereof.

7. The method of claim 1, wherein the water source comprises between 100 ppm and 500 ppm of multivalent cations selected from magnesium ions, calcium ions, ferrous ions, strontium ions, barium ions, copper ions, cobalt ions, manganese ions, nickel ions, zinc ions, aluminum ions, and any combination thereof.

8. The method of claim 1, wherein the dodecyl group is a branched dodecyl group.

9. A metal containment assemblage comprising a metal containment and an inhibitor/cleaner composition in contact with a surface of the metal containment, wherein about 1% to about 100% of the area of the surface of the metal containment comprises a schmoo attached to the surface, wherein the inhibitor cleaner composition comprises an inhibitor/cleaner and a water source, the inhibitor/cleaner comprising one or more alkyldiphenyloxide disulfonates, each alkyldiphenyloxide disulfonate of the one or more alkyldiphenyloxide disulfonates having the formula (I), (II), (III), or (IV)

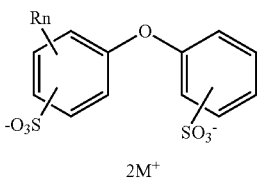

(I)

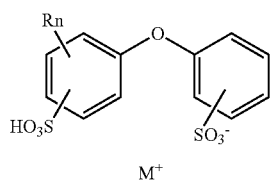

(II)

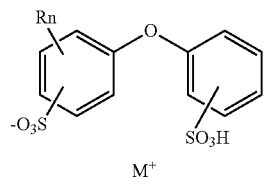

(III)

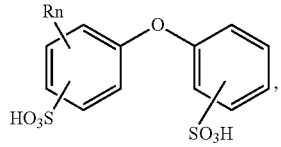

(IV)

wherein R is a dodecyl group, wherein n is 1 or 2, and wherein $M^+$ is selected from $Na^+$, $K^+$, $NH_4^+$, primary ammonium, secondary ammonium, tertiary ammonium, and quaternary ammonium, wherein the water source comprises a produced water, wherein the one or more alkyldiphenyloxide disulfonates are soluble in the water source, and wherein the inhibitor/cleaner composition inhibits corrosion of the metal containment and removes between about 10 wt % and about 100 wt % of the schmoo within four hours.

10. The assemblage of claim 9, wherein the metal containment comprises carbon steel contacting the inhibitor/cleaner composition.

11. The assemblage of claim 9, wherein the water source consists of the produced water.

12. The assemblage of claim 9, wherein the concentration of the one or more alkyldiphenyloxide disulfonates in the inhibitor/cleaner composition is about 40 ppm to about 2000 ppm by weight.

13. The assemblage of claim 9, wherein the concentration of the one or more alkyldiphenyloxide disulfonates in the inhibitor/cleaner is about 40% to about 75% by weight, and the concentration of the inhibitor cleaner in the inhibitor cleaner composition is between about 500 and about 2000 ppm by weight, and wherein the inhibitor/cleaner composition inhibits corrosion of the surface and removes between about 10 wt % and about 20 wt % of the schmoo within four hours.

14. The assemblage of claim 9, wherein the metal containment comprises a pipe, a tank, a device, or combinations thereof, wherein the device is selected from a valve, a tap, a pressure gauge, a flowmeter, a stopcock, a pump, and any combination thereof.

15. The assemblage of claim 9, wherein the dodecyl group is a branched dodecyl group.

* * * * *